(12) United States Patent
Lincke

(10) Patent No.: US 6,572,765 B2
(45) Date of Patent: Jun. 3, 2003

(54) FILTERING SYSTEM FOR SWIMMING POOL

(75) Inventor: Steven L. Lincke, New Carlisle, IN (US)

(73) Assignee: Filter Specialists, Inc., Michigan City, IN (US)

( * ) Notice: Subject to any disclaimer, the term of this patent is extended or adjusted under 35 U.S.C. 154(b) by 70 days.

(21) Appl. No.: 09/793,378

(22) Filed: Feb. 26, 2001

(65) Prior Publication Data

US 2002/0117432 A1 Aug. 29, 2002

(51) Int. Cl.[7] .................. B01D 29/27; B01D 29/58; B01D 35/02; E04H 4/16
(52) U.S. Cl. ............ 210/169; 210/232; 210/249; 210/250; 210/337; 210/416.2; 210/452; 210/484
(58) Field of Search .................. 210/169, 232, 210/249, 250, 315, 337, 416.2, 448, 452, 484, 489, 485

(56) References Cited

U.S. PATENT DOCUMENTS

| | | | | |
|---|---|---|---|---|
| 2,844,255 A | * | 7/1958 | Cavenah et al. ............ | 210/169 |
| 2,900,079 A | * | 8/1959 | Pace ........................... | 210/169 |
| 2,980,256 A | * | 4/1961 | Nash ........................... | 210/169 |
| 3,759,389 A | * | 9/1973 | Valois et al. ................. | 210/169 |
| 3,864,262 A | * | 2/1975 | Lang et al. .................. | 210/169 |
| 3,954,621 A | * | 5/1976 | Etani et al. .................. | 210/169 |
| 4,022,690 A | * | 5/1977 | Smith .......................... | 210/169 |
| 4,268,386 A | * | 5/1981 | May ............................ | 210/169 |
| 4,637,873 A | * | 1/1987 | DeSousa et al. ............. | 210/169 |
| 4,701,259 A | * | 10/1987 | Rosaen ........................ | 210/450 |
| 4,818,389 A | * | 4/1989 | Tobias et al. ................ | 210/169 |
| 5,338,446 A | * | 8/1994 | Schuman et al. ........... | 210/169 |
| 5,662,795 A | * | 9/1997 | Pickens et al. .............. | 210/169 |

* cited by examiner

Primary Examiner—David A. Simmons
Assistant Examiner—Fred Prince

(57) ABSTRACT

A filtering system for swimming pools includes a cylindrical filter housing in which a filter bag is supported in a perforated liner. A skimmer housing is mounted on the cylindrical housing and skims water off of the surface of the pool, which communicates to the inlet chamber through a perforated skimmer basket which catches debris floating on the surface of the pool water. The main drain of the pool is connected directly to the inlet chamber. An outlet of the cylindrical housing communicates directly with the inlet port of a pump that returns filtered water to the pool.

6 Claims, 3 Drawing Sheets understand # FILTERING SYSTEM FOR SWIMMING POOL

TECHNICAL FIELD

This invention relates to filters and more particularly to filters used for filtering swimming pool water.

BACKGROUND OF THE INVENTION

Swimming pools require that their water be filtered in order to assure water of sufficient cleanliness for bathing. Existing swimming pools, both above and below ground, require complicated and expensive filters of sufficient size to efficiently filter pool water. Since the water from the swimming pools must be forced through these filters, pumps used for swimming pool filters require relatively large motors, commonly in the 1-hp. . . range, which consume relatively large amounts of electricity. Furthermore, most prior art swimming pool filters require backwashing periodically. Since the water used for backwashing must be drawn from the pool and then discharged, backwashing the filter consumes a significant quantity of water which must be replaced. Many swimming pools are used in sections of the country which impose water restrictions on residents and/or which normally experience drought conditions in which the water required for backwashing is a significant consumption of water. Furthermore, existing swimming pool filtering systems require complicated plumbing, in which pipes run between the skimmer, and the main drain, the pump, the filter, and the pool inlets, and further require a strainer separate from the filter at the pump inlet.

SUMMARY OF THE INVENTION

According to the present invention, a filter housing mounted adjacent to the pool is provided a skimmer inlet and/or an inlet connected to the main drain of the pool, both of which receive pool water for filtering. A removable perforated basket is mounted within the housing between the inlet from the skimmer and the inlet from the main drain so that the water passing through the skimmer also passes through the strainer. Water is then communicated through a filter bag which is supported away from the walls of the housing by a perforated liner. The basket and filter bag are accessible from an opening above the water level of the pool, so the filter may be serviced without shutting off valves, etc. After passing through the filter bag, the water passes to an outlet chamber which is communicated through the inlet of a pump to an outlet port of the housing. In the case of the aboveground pools, in which the entire assembly is mounted above ground level, a pump may be mounted directly on the filter housing and connected directly to the outlet port. The size of the pump may be relatively small, such as about 1/15 hp. The small pump is satisfactory because the filter bag is at the inlet of the pump. Adjustable legs are provided on the filter housing to provide a support for the filter. Instead of backwashing, the filter bag is changed and discarded periodically. A strainer at the pump inlet separate from the filter is eliminated. In below ground pools, the filter housing is below ground, and the pump is mounted away from the housing and only a single inlet line and a single return line need to be connected to the pump, thereby simplifying plumbing.

DETAILED DESCRIPTION

Figure 1:
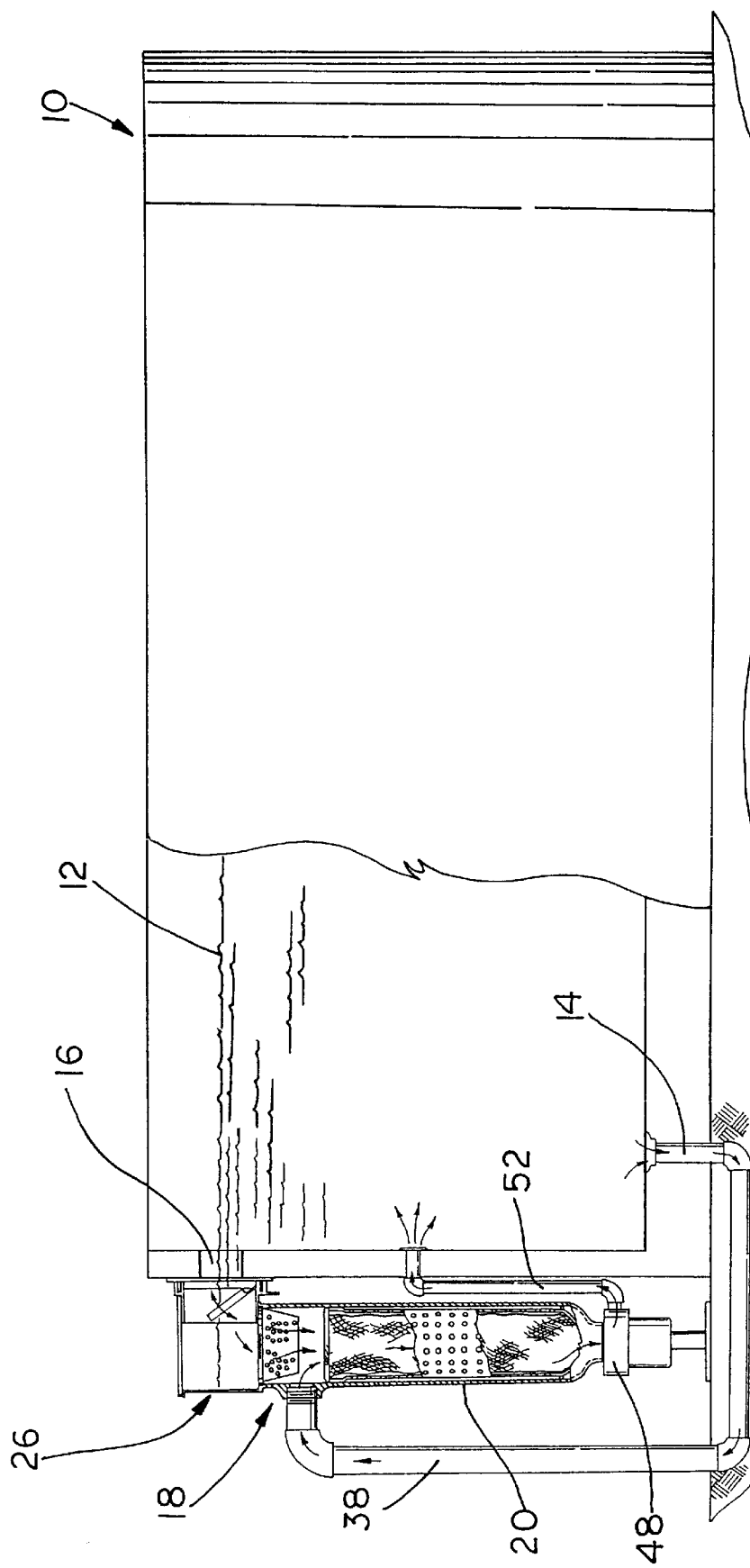
FIG. 1 is a side elevational view, partly in section, of an above ground swimming pool and a filtering system for the swimming pool made pursuant to the teachings of the present invention.
Figure 2:
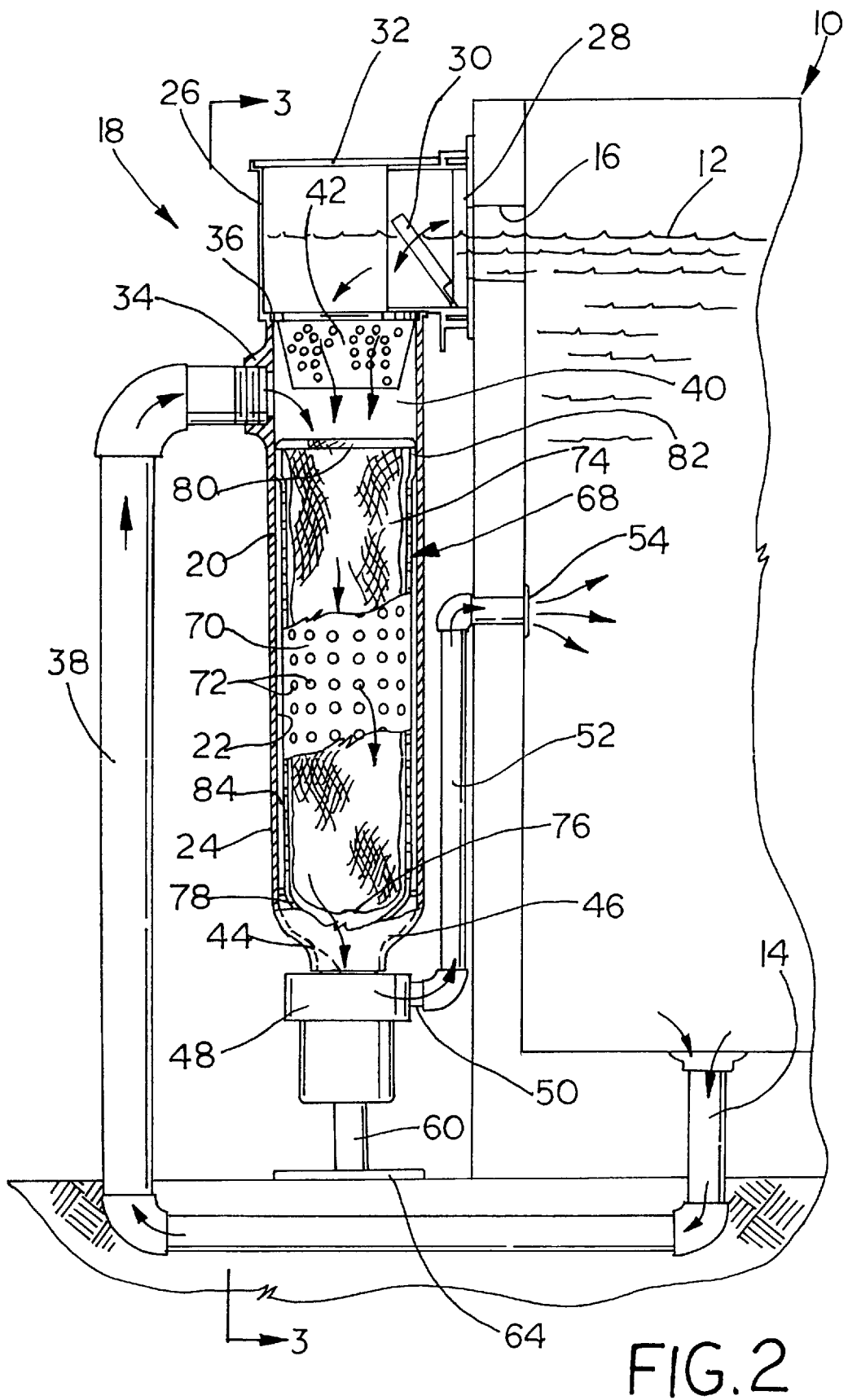
FIG. 2 is an enlarged, fragmentary cross-sectional view of the filtering system illustrated in FIG. 1.

Referring now to the drawings, a swimming pool generally indicated by the numeral 10 is filled with water to a water line indicated at 12. The pool 10 is provided with a main drain indicated at 14 and a skimmer outlet indicated at 16. According to the invention, a filter assembly generally indicated by the number 18 includes a cylindrical housing 20 having a inner circumferential surface 22 and outer circumferential surface 24. Filter assembly 18 further includes a skimmer housing 26 mounted on the top of the cylindrical housing 20 and which includes an open side 28 that extends across the water level in the pool 12, so that both the skimmer housing and the cylindrical housing are filled by gravity to the level 12 of the pool 10. A conventional weir door 30 is hinged to open and close in manner well known to those skilled in the art to allow surface water to move from the pool 10 into skimmer housing 26, additionally, the weir door prevents water from flowing in the reverse direction. The skimmer housing 26 is provided with a lid 32, which is removable to allow access into the skimmer housing 26.

A inlet 34 is provided on the cylindrical housing 20 adjacent the upper end 36 thereof upon which the skimmer housing 26 is mounted, such that the inlet 34 is below the water line 12. The inlet 34 is communicated to main drain 14 via conventional plumbing 38. Accordingly, both the skimmer housing 26 and the main drain 14 are communicated to inlet chamber 40 defined within housing 20. A perforated strainer basket generally indicated by the numeral 42 is supported at upper end 36 of cylindrical housing 20. The strainer basket 42 collects leaves and other debris floating on surface 12 which is received within strainer housing 26, while allowing the water to drain into inlet chamber 40. The inlet 34 allows water from main drain 14 to bypass the strainer basket 42. The strainer basket 42 is emptied periodically by removal of the lid 32, which allows access to the strainer basket 42, which is merely supported on the housing 20 and may be manually moved through the opening closed by lid 32, emptied, and replaced within cylindrical housing 20.

The cylindrical 20 includes an outlet opening 44 at the lower end 46 thereof viewing the drawings. Outlet opening 44 communicates directly to the inlet port of a conventional electric motor driven pump 48. As illustrated in the drawings, pump 48 is secured directly onto the cylindrical housing 20, such that the outlet opening 44 communicates directly with the inlet port of the pump 48. The outlet port 50 of pump 48 is connected via plumbing 52 to pool inlet 54, which discharges pool water back into the swimming pool 10 after having passed through the strainer housing 26 and cylindrical housing 20. The pump 48 may be relatively small, having a capacity, for example, of 1/15 hp. Conventional pool filtering systems require a much larger pump, because the pump must have sufficient power to force pool water through large conventional filters which are at the outlet of the pump. In the present invention, water communicates through the filter housing 20, which is at the inlet of the pump, so that the pump need not have sufficient capacity to force the water through a conventional restrictive filter.

Although the filter assembly 18 is illustrated in the drawings as being used with an above ground pool, the filter assembly 18 may also be used with a below ground pool, in which case the housing 20 would be below ground level. In this case, it is more convenient to mount the pump 48 in a remote, above ground location, and connect the housing 20 to the pump via appropriate plumbing.

Figure 3:
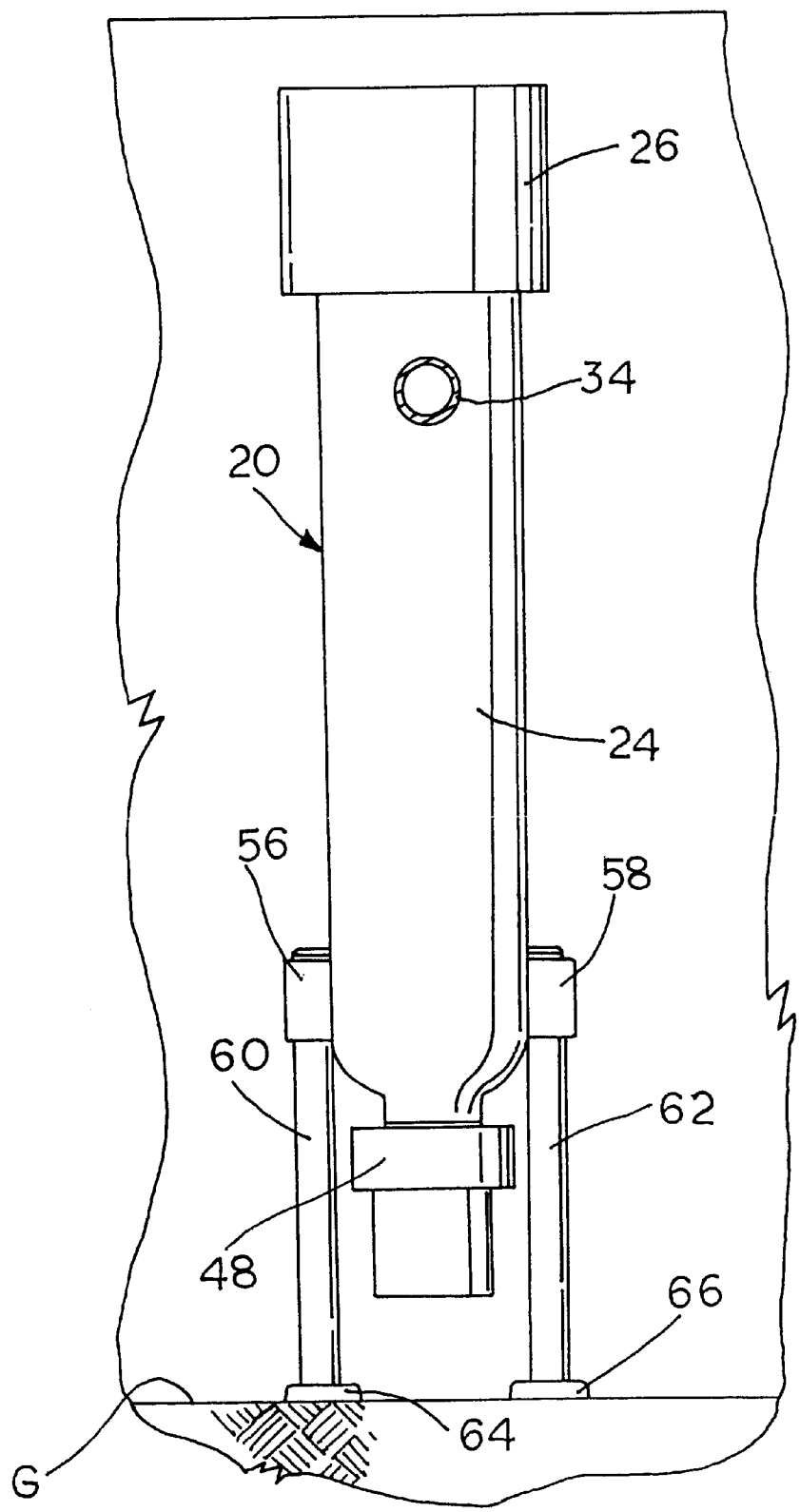
FIG. 3 is a cross-sectional view taken substantially along lines 3—3 of FIG. 2.

A pair of brackets 56, 58 are mounted on circumferentially offset portions of the outer circumferential surface 24 of the housing 20. Each of the brackets 56, 58 receive a corresponding leg 60, 62, via a threaded connection which terminates in a pad 64, 66. Each pad 64, 66 engages the support surface upon which the filter assembly 18 is mounted, such as that represented by the ground level "G". Accordingly, the housing 20 may be leveled by adjusting the positions of the legs 60, 62 by their threaded connections with the brackets 56, 58. As illustrated in FIG. 3, the motor driven pump 48 is straddled by the legs 60, 62.

A conventional perforated liner generally indicated by the numeral 68 is mounted within the housing 20 and includes an outer circumferential surface 70 through which perforations 72 extend. The liner 68 is mounted within the housing so that a small clearance exists between the outer circumferential surface 70 of the liner and the inner circumferential surface 22 of housing 20. A conventional filter bag, such as that commercially available as Model No. X-100 from Filter Specialists, Inc., Michigan City, Ind., is indicated at 74. Filter bag 74 is sized to fit within the liner 68 such that the closed end of 76 of filter bag 74 extends adjacent the closed end 78 of the liner 68, and the opposite open end of the bag 74 is held open by a ring 80 which engages the upper end surface 82 of the liner 68. Accordingly, the filter bag 74 receives water from the swimming pool 10 which is communicated into inlet chamber 40, and is of porous design that permits the water to pass through the filter bag 74, retaining any particulate matter entrained in the water within the bag. After passing through the bag, the water passes into an outlet chamber 84 defined between the outer surface of the bag and the inner circumferential surface 22 of the housing 20. Outlet chamber 84 is communicated directly to the outlet opening 44.

As long as the water level 12 of the pool 10 remains above the lower edge of open side 28 of skimmer housing 26, swimming pool water will drain through main drain 14 and be communicated into inlet chamber 40 through the opening 34, since the opening 34 is below the level 12 of water in pool 10. At the same time, the surface 12 of the pool will be skimmed by skimmer, so that water is taken from the upper portion of the level in the pool and fed pass the weir door 30 and through the perforated basket 42 and into inlet chamber 40. Accordingly, large debris floating on the surface of the water in the pool will be captured in the basket 42, while the water will drain into inlet chamber 40. Accordingly, water thereafter communicates through the filter bag 74 and into the outlet chamber 84.

As long as the pump 48 is running, water will be drawn through the filter bag 74 from outlet chamber 40 and discharged through opening 54 back into the swimming pool 10. Accordingly, particles entrained in the pool water will be captured by the filter bag 74. Periodically, the filter bag 74 is changed, by turning off the pumps, removing the basket 42 and then grasping the ring 82 to withdraw the bag 74 out of the housing 20. A new filter bag is then installed in the housing 20, the strainer basket 42 replaced, and the pump 48 started to resume filtration of water in the pool 10. Conventional filters in swimming pools require periodic backwashing to remove material captured by the filter during filtering. This is normally done, depending upon pool use, on a weekly or biweekly cycle. Backwashing a conventional filter consumes a not insignificant quantity of pool water, particularly in pools installed in areas where municipal authorities impose water use restrictions. In the present invention, no backwashing is required, it being necessary only to remove and discard filter bag 74 and replace it with a new one. Although the bag 74 must be replaced periodically, the expense of providing a new bag is relatively small.

It is also a feature of the present feature that the skimmer is a part of the housing 20 in which the filter bag 74 is installed. Accordingly, plumbing is simplified, in that the only plumbing required is the plumbing line 38 communicating the main drain 14 within the inlet chamber 40 and the plumbing line 52 communicating the pump 48 to the pool inlet 54. Most conventional swimming pool installations require long runs of pipe to communicate the skimmer to the filter housing, the main drain to the filter housing, and the pump with the filter housing and the pool inlets.

What is claimed is:

1. Pool filter comprising a housing having an inlet chamber for receiving water from said pool for filtering and an outlet chamber, a skimmer inlet extending across the surface of the water in said pool, said skimmer inlet communicating with said inlet chamber, a pump having an inlet communicated with the outlet chamber, said housing having an inner circumferential surface, a perforated liner offset from said inner circumferential surface of the housing, and a filter bag supported by said liner and having an open end receiving water from said skimmer inlet and from said main drain inlet, said pump drawing water from said inlet chamber through said filter bag and said perforated liner whereby the water is filtered by said filter bag, said housing defining an upper end, a lower end, and an outer circumferential surface extending between the upper and lower ends, a bracket mounted on said outer circumferential surface, and a leg secured to said housing by said bracket and extending past the lower end of said housing for engagement with a supporting surface to support said housing on said supporting surface.

2. Pool filter as claimed in claim 1, wherein a pair of said brackets and their corresponding legs are mounted on circumferentially offset portions of said outer circumferential surface.

3. Pool filter as claimed in claim 2, wherein said pump is mounted on said lower end of said housing between legs, said pump inlet communicating with said outlet chamber through a fitting extending through said lower end of said housing.

4. Pool filter as claimed in claim 2, wherein said legs include an adjustable connection with said brackets to permit the legs to be extended and retracted relative to said lower end of said housing.

5. Fluid filter assembly comprising a circumferential housing defining a volume there within, said housing including a pair of inlet ports and an outlet port, a filter media within said housing dividing said volume into an inlet chamber communicated with said inlet ports and an outlet chamber communicated with said outlet port, and a perforated basket within said housing between said inlet ports for straining fluid communicated through one of said inlet ports before passing to said filtering media while allowing fluid communicated through the other inlet port to bypass said basket and pass directly to said filtering media, said housing defining an outer circumferential surface extending between said ports, a pair of circumferentially offset brackets mounted on said outer circumferential surface, and a pair of legs secured to said housing by said brackets, said legs extending past a corresponding end of said housing for engagement with a supporting surface to support said housing on said supporting surface.

6. Fluid filter assembly as claimed in claim 5, wherein said legs include an adjustable connection with said bracket to permit legs to be extended and retracted relative to said housing.

* * * * *